United States Patent
Paul et al.

(10) Patent No.: US 9,112,382 B2
(45) Date of Patent: Aug. 18, 2015

(54) ELECTRIC VEHICLE CHARGING SCHEDULING SYSTEM

(75) Inventors: Topon Kumar Paul, Kanagawa-ken (JP); Hideyuki Aisu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 579 days.

(21) Appl. No.: 13/413,780

(22) Filed: Mar. 7, 2012

(65) Prior Publication Data

US 2012/0245750 A1     Sep. 27, 2012

(30) Foreign Application Priority Data

Mar. 25, 2011    (JP) .................................. 2011-068638

(51) Int. Cl.

| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *G05D 1/00* | (2006.01) |
| *G06F 7/00* | (2006.01) |
| *G06F 17/00* | (2006.01) |
| *G01C 22/00* | (2006.01) |

(Continued)

(52) U.S. Cl.

CPC ............... *H02J 3/14* (2013.01); *B60L 11/1844* (2013.01); *B60L 11/1846* (2013.01); *G06Q 10/06314* (2013.01); *G06Q 50/06* (2013.01); *H02J 13/0006* (2013.01); *H02J 2003/003* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 10/54* (2013.01); *Y04S 30/14* (2013.01)

(58) Field of Classification Search

CPC ............... H02J 7/00; H02J 9/00; G62M 6/00; B60K 6/20; G06F 17/00; G06F 7/00; G06Q 40/00

USPC .............. 700/291, 295, 296, 297; 701/22, 24; 705/35; 307/43, 62, 80, 82, 35, 149, 307/150, 416, 933, 935, 988, 991; 320/104, 320/108, 109, 126, 124, 134, 130; 180/14, 180/205, 65

See application file for complete search history.

(56) References Cited

U.S. PATENT DOCUMENTS 5,650,710 A * 7/1997 Hotta ............................. 320/128
7,256,516 B2 * 8/2007 Buchanan et al. .............. 307/62

(Continued)

FOREIGN PATENT DOCUMENTS

| JP | 2008-067418 | 3/2008 |
|---|---|---|
| JP | 2010-022099 | 1/2010 |
| JP | 2010-110044 | 5/2010 |

*Primary Examiner* — Mohammad Ali
*Assistant Examiner* — Md Azad
(74) *Attorney, Agent, or Firm* — Amin, Turocy & Watson, LLP

(57) ABSTRACT

A charging prediction database stores information on electric vehicles expected to arrive for charging. A profile/charging information database stores information on electric vehicles that have arrived and been waiting for charging. A power database stores information on a power source including at least one of a power grid and a stationary battery. An energy calculating unit calculates energy available from the power source based on the power database. A scheduling unit schedule charging of the electric vehicles waiting for charging in consideration of the electric vehicles expected to arrive.

8 Claims, 8 Drawing Sheets

(51) Int. Cl.
*G06Q 40/00* (2012.01)
*H02J 7/00* (2006.01)
*H02J 7/14* (2006.01)
*H02J 1/10* (2006.01)
*H02J 3/38* (2006.01)
*H02J 7/34* (2006.01)
*H02J 3/00* (2006.01)
*B60K 1/00* (2006.01)
*B60K 6/20* (2007.10)
*H02J 3/14* (2006.01)
*G06Q 50/06* (2012.01)
*G06Q 10/06* (2012.01)
*B60L 11/18* (2006.01)
*H02J 13/00* (2006.01)

(56) References Cited

U.S. PATENT DOCUMENTS

| | | | |
|---|---|---|---|
| 7,679,336 B2 | 3/2010 | Gale et al. | |
| 8,169,186 B1 * | 5/2012 | Haddad et al. | 320/109 |
| 8,315,930 B2 * | 11/2012 | Littrell | 705/35 |
| 2008/0281663 A1 | 11/2008 | Hakim et al. | |
| 2009/0313103 A1 * | 12/2009 | Ambrosio et al. | 705/14.25 |
| 2010/0174667 A1 * | 7/2010 | Vitale et al. | 705/412 |
| 2011/0191266 A1 * | 8/2011 | Matsuyama | 705/412 |
| 2012/0112698 A1 * | 5/2012 | Yoshimura et al. | 320/109 |
| 2012/0153896 A1 * | 6/2012 | Rossi | 320/109 |
| 2013/0054045 A1 * | 2/2013 | Ramezani et al. | 700/297 |
| 2013/0339072 A1 * | 12/2013 | Touge | 705/5 |

* cited by examiner

|  | EV BATTERY TYPE | | | | |
|---|---|---|---|---|---|
| Time | A | B | C | D | E |
| 10:00 | 1 | 0 | 1 | 2 | 0 |
| 11:00 | 3 | 1 | 2 | 2 | 3 |
| 12:00 | 3 | 2 | 3 | 1 | 2 |
| 13:00 | 1 | 2 | 3 | 4 | 1 |
| 14:00 | 1 | 1 | 1 | 0 | 1 |
| 15:00 | 2 | 3 | 4 | 1 | 2 |
| 16:00 | 4 | 1 | 1 | 1 | 0 |
| 17:00 | 2 | 4 | 3 | 1 | 1 |
| 18:00 | 1 | 2 | 3 | 2 | 1 |
| 19:00 | 1 | 0 | 1 | 2 | 0 |
| 20:00 | 1 | 0 | 0 | 0 | 1 |
| 21:00 | 1 | 0 | 1 | 0 | 0 |
| 22:00 | 0 | 0 | 0 | 0 | 1 |
| 23:00 | 0 | 0 | 1 | 0 | 0 |

FIG. 2

| EV Id | DEPARTURE TIME | BATTERY CAPACITY (Ah) | REMAINING CAPACITY (SOC) (%) | TARGET SOC (%) | REQUIRED CAPACITY (Ah) | $T_i^{diff}$ (Min) | CHARGING RATE | CHARGING CURRENT ($I_i$) |
|---|---|---|---|---|---|---|---|---|
| A | 10:00 | 125 | 20 | 60 | 50 | 60 | 0.4 | 50 |
| B | 11:00 | 100 | 25 | 75 | 50 | 120 | 0.3 | 30 |
| C | 09:45 | 90 | 30 | 80 | 45 | 45 | 0.7 | 63 |
| D | 10:15 | 120 | 22 | 72 | 60 | 75 | 0.4 | 48 |
| E | 10:30 | 110 | 18 | 58 | 44 | 90 | 0.3 | 33 |
| F | 11:00 | 100 | 15 | 75 | 60 | 120 | 0.3 | 30 |
| G | 12:00 | 115 | 10 | 60 | 57.5 | 180 | 0.2 | 23 |
| H | 11:30 | 110 | 20 | 50 | 33 | 150 | 0.1 | 11 |

$Qe = (\text{TARGET SOC} - \text{REMAINING SOC}) * Q/100$ $CR = \text{round}((\text{TARGET SOC} - \text{REMAINING SOC})/(100 * T_i^{diff}), 1)$

FIG. 4

AVAILABLE POWER P(t)=160kW; I(t)=640A@200V

| EV Id | CAPACITY REQUIRED TO REACH TARGET (Ah) | $T_i^{diff}(t)$ | $I_i^{avg}(t)$ | $I_i^{prop}(t)$ | $I_i(t)$ |
|---|---|---|---|---|---|
| A | 40 | 36 | 62.5 | 157.17 | 125 ← Max limit |
| B | 30 | 96 | 20 | 50.29 | 50 |
| C | 35 | 24 | 90 | 226.32 | 200 ← Max limit |
| D | 50 | 48 | 60 | 150.88 | 144 ← Max limit |
| E | 32 | 72 | 22 | 55.32 | 55 |

FIG. 5

ELECTRIC VEHICLE CHARGING SCHEDULING SYSTEM

CROSS REFERENCE TO RELATED APPLICATIONS

This application is based upon and claims the benefit of priority from the prior Japanese Patent Application No. 2011-068638, filed on Mar. 25, 2011, the entire contents of which are incorporated herein by reference.

FIELD

Embodiments of the present invention relate to a charging scheduling system for Electric Vehicles (EVs), Plug-in Electric Vehicles (PEVs), Plug-in Hybrid Electric Vehicles (PHEVs), Battery Electric Vehicles (BEVs), and Hybrid Electric Vehicles (HEVs), and relate to charging scheduling for such vehicles at a charging station, office building, plant, supermarket, coin-parking, or convenience store, for example.

BACKGROUND

EVs are expected to be widely adopted across the world in future because of their small environmental impact and low maintenance and running costs. These cars can be charged either in an ordinary charging (slow charging) mode or a rapid charging mode. During charging, a trade-off relationship holds between the charging time and the power requirement. The ordinary charging requires less electric power than the rapid charging but takes as long as several hours. Rapid charging, on the other hand, rapidly charges an EV battery in several minutes but requires a large amount of electric power. In order to offset power requirement for EV charging, many charging stations, service stations, charging stations in office buildings, plants, supermarkets, apartment buildings, hotels, and coin-parkings will maintain high capacity stationary batteries. Power supply from a power grid and power price can vary in the course of a day. Hereinafter, charging facilities provided at service stations, office buildings, plants, supermarkets, apartment buildings, hotels, convenience stores, and coin-parkings will be referred to as charging stations.

Due to limitation in available power from a power grid, charging and discharging rates of batteries, and different departure times, EVs waiting at a charging station (i.e., EVs in a queue) cannot be charged at the same charging rate. Additionally, because the arrival of EVs at a charging station located such as at a supermarket, convenience store, coin-parking center is virtually probabilistic, all energy from a stationary battery cannot be used for charging the EVs in a queue when a fair use policy is applied. In this case, prediction of future power requirement for the EVs is necessary. It is required to adjust the charging rate for EVs that have arrived in accordance with predicted power requirement for EVs in the next time range and the departure time of the EVs. Thus, dynamic scheduling for EV charging at a charging station will be required in future.

When using a fair use policy, it is desirable to determine charging energy that can be supplied to the EVs waiting at a charging station in consideration of EVs that are possible in the next time range. It is also desired to schedule charging of waiting EVs so as to meet many constraints, such as the electric power available from a grid at each time of a day, power from a stationary battery, maximum charging and discharging rates of batteries, and departure time of waiting EVs (i.e., time of use).

BRIEF DESCRIPTION OF THE DRAWINGS

FIG. 2 shows an example of predicted number of EVs at different times;

FIG. 4 shows an exemplary calculation of initial charging current;

FIG. 5 shows an example of proportional distribution of available current among waiting EVs;

DETAILED DESCRIPTION

According to an embodiment, there is provided an electric vehicle charging scheduling system. The system includes a charging prediction database, a profile/charging information database, a power database, an energy calculating unit and a scheduling unit.

The charging prediction database stores information about electric vehicles expected to arrive for charging.

The profile/charging information database stores information about electric vehicles that have arrived and been waiting for charging.

The power database stores information about a power source including at least one of a power grid and a stationary battery.

The energy calculating unit calculates energy available from the power source based on the power database.

The scheduling unit schedules charging of the electric vehicles waiting for charging.

The scheduling unit calculates available average energy by dividing electric energy available from the power source by the total number of the expected electric vehicles and the electric vehicles waiting for charging.

The scheduling unit calculates required (demanded) charging energy for each of the electric vehicles waiting for charging based on the profile/charging information database.

The scheduling unit determines the first group of waiting electric vehicles each of whose required charging energy is equal to or smaller than the available average energy, calculates the difference between the available average energy and the required charging energy for each of the first group of waiting electric vehicles, and sets the supplied charging energy of each of the first group of waiting electric vehicles to the required charging energy.

The scheduling unit determines the second group of waiting electric vehicles each of whose required charging energy is larger than the available average energy, distributes the total sum of differences of available average energy and the required charging energy of each of the first group of waiting electric vehicles among the second group of waiting electric vehicles in proportion to magnitudes of differences between the available average energy and the required charging energy of each of the second group of waiting electric vehicles and calculates the supplied charging energy for each of the second group of waiting electric vehicles by summing the proportionally distributed energy and the available average energy.

The scheduling unit makes a charging schedule so that the first group of waiting electric vehicles and the second group of waiting electric vehicles are respectively supplied with charging energies determined for the first group of waiting electric vehicles and the second group of waiting electric vehicles.

Hereinafter, embodiments will be described below with reference to drawings.

Figure 1:
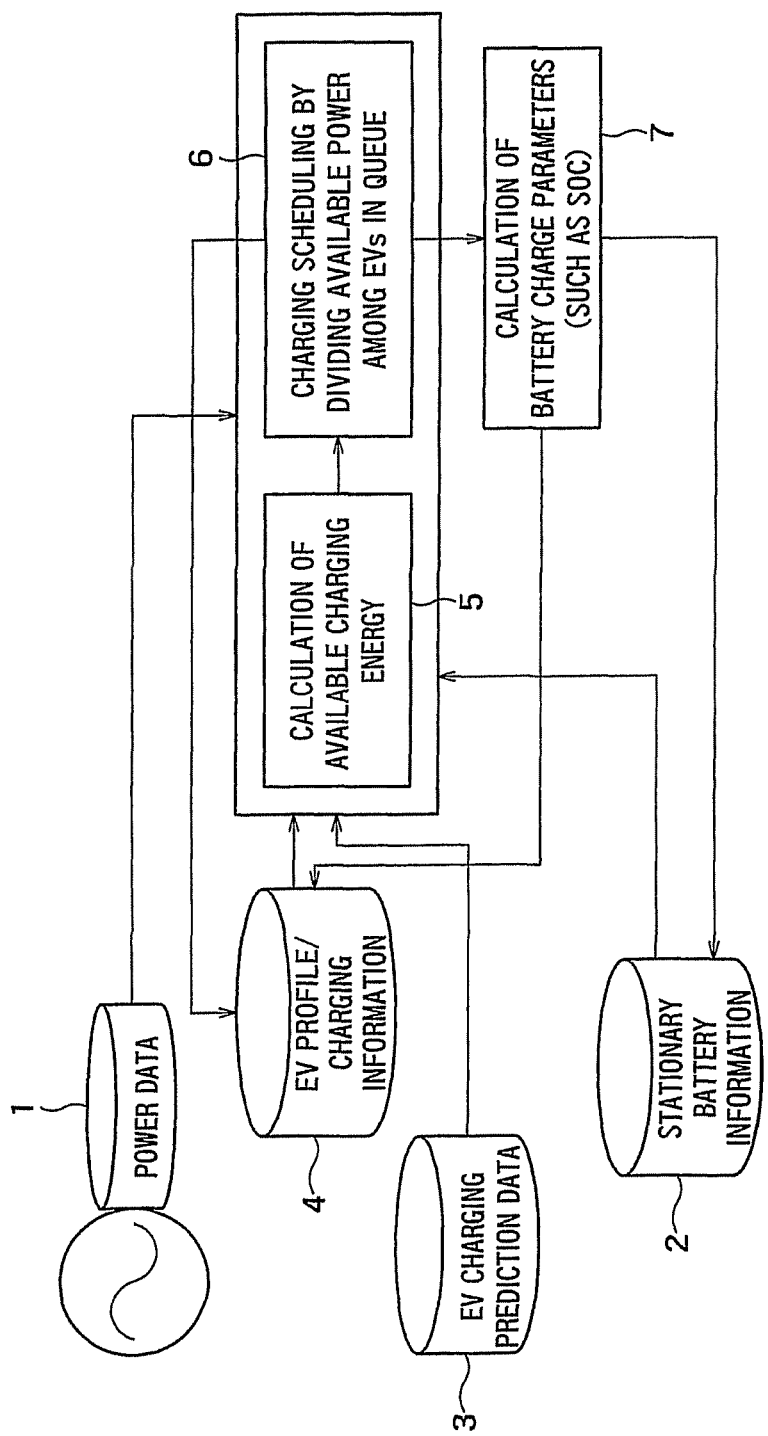
FIG. 1 is a block diagram of an EV charging scheduling system.

FIG. 1 shows an overall system for making a charging schedule of electric vehicles (EVs) at a charging station.

The system includes power data 1, stationary battery information 2, EV charging prediction data 3, EV profile/charging information 4, a module 5 for calculating available charging energy that can be supplied to waiting EVs (EVs in a queue), a charging scheduling module 6 for scheduling distribution of available electric power among EVs in a queue, and a battery charge parameter calculating module 7. Battery charge parameters include SOC (State of Charge), for example.

The EV charging prediction data 3 includes expected arrival times of EVs and information about their profiles. Several examples of how to obtain this data are given below.

For a charging station located in an office building or a plant, EV charging prediction data can be obtained from data on employees' working hours at the office building or plant in conjunction with registration information about EVs used by employees. EV arrival and departure times can be predicted from an employee work schedule and an EV profile is registered to an office information system at the time of EV registration. Averages of arrival time, departure time, and amount of charge can be considered as predicted arrival time, predicted departure time, and predicted amount of charge, respectively. By way of an example, when the arrival times of an employee are 8:16, 8:25 and 8:19, departure times are 17:12, 17:15 and 17:09, and amounts of charge are 9 kWh, 11 kWh and 10 kWh, predicted arrival time, departure time and amount of charge will be 8:20, 17:12, and 10 kWh, respectively, by averaging the corresponding values.

For a charging station located at a hotel, EV charging prediction data can be obtained from hotel reservation data. Charging of an EV can be reserved by entering EV data at the time of hotel reservation and the arrival time and profile of the EV can be predicted from reservation data.

Data about a taxi charging station can be obtained from taxi driving data kept by a taxi control center. When a passenger gets in a taxi, the place of departure and destination are reported to the taxi control center using wireless communication. The data is used to determine whether the taxi should go to the nearest charging station, calculate the remaining battery power, and obtain an EV profile.

For a charging station located at a supermarket or coin-parking, arrival of EVs is substantially probabilistic, and data about previous charging histories can be used to predict arrival times and profiles of EVs. When such data is not available, a probabilistic model such as Poisson process may be used for prediction of EV arrivals.

FIG. 2 shows an example of EV charging prediction data. Temporal arrival of different types of EVs at different times is shown in the table. EV arrival times may be evenly distributed within each time range. For example, when four EVs are expected to arrive at 10 a.m., they are expected to arrival at 10:00 a.m., 10:15 a.m., 10:30 a.m., and 10:45 a.m.

The EV profile/charging information database 4 contains information about EVs that are waiting for charging and the ones that are currently being charged. The database 4 contains EV IDs, EV battery capacity, maximum charging voltage, maximum charging current, charging efficiency, maximum numbers of charging and discharging cycles, histories of charging and discharging cycle numbers, minimum SOC (for preventing degradation), target SOC or energy consumption efficiency (kWh/km), expected running distance (km), departure time (driving start time), and charging information. The charging information includes EVSE (Electric Vehicle Supply Equipment) connector IDs, charging start time, charging end time, charging current/voltage, current SOC, or charged energy (kWh), and the remaining time required to achieve the target SOC. The time period between arrival time and departure time represents a charging available period.

The power database 1 contains information about electric power available from a power grid and/or a DER (Distributed Energy Resource) on an hourly or daily basis. The database 1 may also contain information about dynamic price of power.

The stationary battery information database 2 contains stationary battery information, such as battery capacity, maximum charging current, nominal discharge voltage, maximum discharging current, minimum SOC, and histories of charging and discharging cycle numbers.

The energy calculating module 5 calculates available charging energy (kWh) that can be provided to waiting EVs based on the power data 1 and stationary battery information 2. The scheduling module 6 (scheduling unit) calculates the number of EVs that will arrive in the next time range based on the EV charging prediction data 3, calculates the charging energy that can be supplied to the waiting electric vehicles and generates a charging schedule for the waiting EVs by distributing available power. The parameter calculating unit 7 calculates parameters, such as battery SOC. An algorithm for calculating charging energy to be provided to waiting EVs using a fair use policy is shown below.

Step 1: determine the predicted number of EVs for the next time range, $EV_{pred}(t+1, t+2, \ldots)$.

Step 2: obtain the number of EVs waiting at the charging station, $EV_{queue}(t)$.

Step 3: calculate the total number of EVs, $EV(t, t+1, \ldots) = EV_{pred}(t+1, t+2, \ldots) + EV_{queue}(t)$.

Step 4: calculate total power (or energy) available from the grid.

$$P_{grid}(t, t+1, t+2, \ldots) = \sum_t P_{grid}(t) \qquad \text{[Formula 1]}$$

Step 5: obtain stationary battery energy, $P_{Sbat}(t)$.

Step 6: calculate energy requirement for EVs now being charged, $P_{incharge}(t, \ldots)$. That is, calculate the current energy requirement for EVs that have started charging ahead of waiting EVs.

Step 7: calculate average charging energy, $Pt_{avail}(t)$ available for each EV (a waiting and expected EV).

Step 8: find EVs in the queue (first group of waiting electric vehicles) whose required charging energy is smaller than the available average charging energy $Pt_{avail}(t)$ and add up surplus energy (i.e., energy corresponding to the difference) to determine $Pt_{dist}(t)$.

Step 9: find EVs in the queue (second group of waiting electric vehicles) whose required charging energy is larger than the available average charging energy $Pt_{avail}(t)$ and proportionally distribute "$Pt_{dist}(t)$" among these EVs (the second group of waiting electric vehicles).

Available average charging energy for each EV (waiting or expected EV) can be calculated as:

$$Pt_{avail}(t) = \frac{P_{grid}(t, t+1, \ldots) + P_{Sbat}(t) - P_{incharge}(t, \ldots)}{EV_{queue}(t) + EV_{pred}(t+1, t+2, \ldots)} \quad \text{[Formula 2]}$$

Then, charging energy available for allocation to EVs having a high charging energy requirement is calculated as:

$$Pt_{dist}(t) = \sum_{i \in queue} \text{Max}(0, Pt_{avail}(t) - Pt_{EV_i}^{req}) \quad \text{[Formula 3]}$$

where "$Pt_{Evi}^{req}$" represents required charging energy for EVi.

Finally, the available energy is proportionally distributed among EVs to calculate charging energy that can be provided to waiting EVs.

$$Pt_{EV_i}^{offered} = \min\left(Pt_{EV_i}^{req}, Pt_{avail}(t) + \frac{Pt_{dist}(t)\text{Max}(0, Pt_{EV_i}^{req} - Pt_{avail}(t))}{\sum_{k \in queue} \text{Max}(0, Pt_{EV_k}^{req} - Pt_{avail}(t))}\right) \quad \text{[Formula 4]}$$

Figure 3:
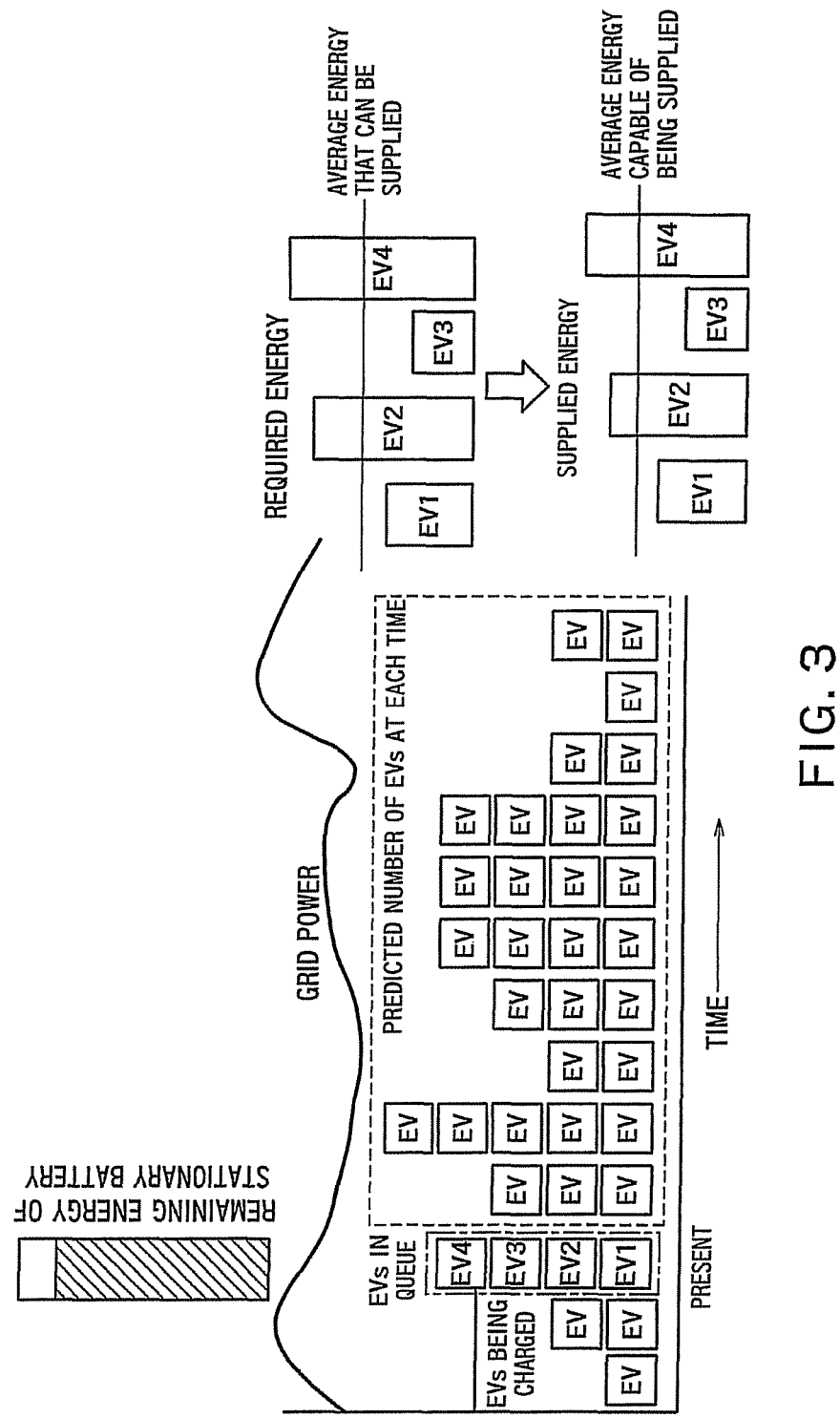
FIG. 3 shows an exemplary calculation of charging energy that can be supplied to waiting EVs.

FIG. 3 shows an exemplary calculation of charging energy that can be supplied to EVs waiting at a charging station.

For each one of waiting EVs (the EVs at "present" in the figure), an amount of electric charge to supply ($Q_i^c$) and an SOC to be added (charge SOC, $SOC_i^c$) are calculated as shown below assuming a constant nominal discharging voltage ($V_i$), where "$Q_i$" represents the EV's battery capacity.

$$Q_i^c = Pt_{EV_i}^{offered} / V_i \text{ and } SOC_i^c = \frac{Q_i^c}{Q_i} \quad \text{[Formula 5]}$$

The sum of the charge SOC and a current SOC represents a target SOC. As understood from Formula (4), the target SOC may or may not agree with (or not satisfy) an SOC required by the EV.

Next, electrical power available at each time during a charging period is calculated. To this end, a charging rate for expected EVs (a rate in terms of charging current) is assumed. EVs are charged using First Come First Serve (FCFS) policy. The FCFS policy means that an EV arriving earlier is given a higher priority for charging.

Using the charging rate, charging time period required for expected EVs is calculated. Charging power is calculated by multiplying voltage by current, i.e., P=V×I.

Predicted EV power requirement is calculated as:

$$P_{EV}(t) = \sum_{i=1}^{n} \delta_i(t) \times Q_i \times CR_i(t) \times V_i(t) \quad \text{[Formula 6]}$$

$$\delta_i(t) = \begin{cases} 1 & \text{if } EVi \text{ is being charged} \\ 0 & \text{otherwise} \end{cases}$$

where "t" is time, "Q" is the battery capacity of EVi, "$CR_i(t)$" is charging rate (a rate in terms of charging current), "$V_i(t)$" is charging voltage, and "n" is the number of EVs at the charging station (waiting ones and ones predicted to arrive in future). The value of "$\delta_i(t)$" is 1 when EVi is currently being charged and 0 otherwise (e.g., an EV with its predicted arrival time not reached yet).

Given the predicted power requirement, predicted energy requirement for the stationary battery (i.e., energy that will be required from the stationary battery) is calculated as:

$$P_{pred}^{Sbat}(t+1, t+2, \ldots) = \sum_{i=t+1}^{T} \max(0, P_{EV}(i) - P_{grid}(i)) \quad \text{[Formula 7]}$$

where "$P_{grid}(i)$" represents power available from the grid at time i, and "T" is the time period of scheduling (e.g., one day (1,440 minutes)).

Then, the total power available from the grid and the stationary battery at time t is calculated as:

$$P_{avail}(t) = P_{grid}(t) + P_{Sbat}(t) - P_{pred}^{Sbat}(t+1, t+2, \ldots) \quad \text{[Formula 8]}$$

where "$P_{Sbat}(t)$" represents the maximum power available from the stationary battery at time t.

Given the available power, the charging rate for waiting EVs is determined. Three examples of calculating the charging rate by dividing available power among EVs are shown.

FIRST EXAMPLE

In the first example, electric power available at each time is proportionally distributed among waiting EVs. Accordingly, the EV charging rate varies with time.

First, departure times of EVs are retrieved from EV profiles. Next, available charging time period for each EV is calculated. The available charging time period can be estimated as the difference between departure time and the present time. In order to complete charging of EVs while achieving their target SOC by the expected departure times, a minimum average charging power at each time is calculated. A minimum average charging current at each time can be calculated as follows for example, where "SOCi(t)" is the current SOC and "$SOC_i^{final}$" is the target SOC:

$$I_i^{avg}(t) = Q_i \times \text{round}\left(\frac{SOC_i^{final} - SOC_i(t)}{100 * T_i^{diff}(t)}\right) \quad \text{[Formula 9]}$$

In the formula, "$Q_i$" is the battery capacity of EVi, "$T_i^{diff}$" is time period available for charging (the difference between departure time and the present time), and the "round" function rounds a value to the closest integer (i.e., rounding off). An example of this calculation is shown in FIG. 4, where expected charging quantity "$Q_e$" is: (target SOC−remaining SOC)×Q/100. An initial charging rate is calculated as shown by Formula (10) below, where "$SOC_i^{init}$" represents the initial SOC of the battery. "Required capacity" in the table of FIG. 4 represents expected charging quantity $Q_e$. "Charging rate" in the table is calculated by Formula (10). "Charging current" in the table is calculated by battery capacity×charging rate. "Charging current" shown in FIG. 4 is the initial charging current.

$$CR_i = \text{round}\left(\frac{(SOC_i^{final} - SOC_i^{init})}{100 * T_i^{diff}}\right) \quad \text{[Formula 10]}$$

Based on the available power, available current I(t)=$P_{avail}$(t)/V is calculated assuming charging at a constant voltage. The available current is distributed among waiting EVs according to policies and priority weighing. The priority weighting may set a heavier weight for earlier arrival or may use a different criterion. An example of proportional distribution of available current is shown below.

$$I_i(t) = \min(I_i^{max}, \text{rounddown}(I_i^{prop}(t)/Q_i, 1) * Q_i) \quad \text{[Formula 11]}$$

$$I_i^{prop}(t) = \frac{I(t)I_i^{avg}(t)}{I_1^{avg}(t) + I_2^{avg}(t) + \ldots + I_n^{avg}(t)}$$

$$I_i^{avg}(t) = Q_i \times \text{round}\left(\frac{(SOC_i^{final} - SOC_i(t))}{100 * T_i^{diff}(t)}\right)$$

$I_i^{max}$: rated maximum charging current of EVi
$I_i^{avg}(t)$: average charging current necessary for charging EVi to the target SOC within the remaining time
$SOC_i(t)$: current SOC of EVi
$Q_1, Q_2, \ldots, Q_n$: battery capacity of EVs
$I(t)=P_{avail}(t)/V$: available current given a constant voltage
$P_{avail}$: available power.

The smaller of $I_i^{max}(t)$ and $I_i^{prop}(t)$ is adopted as $I_i(t)$. The example calculation of (11) includes digit adjustment through processing using "rounddown" function. The "rounddown" function rounds a value to the nearest integer. For example, it converts 4.5 to 4.

For some EV batteries, it may be required that charging current be in descending order, that is, $I_i(t) \geq I_i(t+1)$. In this case, $I_i(t)$ for an EV currently being charged is decreased and $I_i(t)$ for an EV that has been newly connected is proportionally increased.

FIG. 5 shows an exemplary distribution of available power among EVs. For EVs A, C, and D, maximum allowed charging currents are 125 A, 200 A, and 144 A, respectively, so these values are used instead of greater values determined by proportional calculation.

SECOND EXAMPLE

A second example of distribution of available power among EVs is to charge EVs at a constant charging rate. That is, current does not vary during EV charging but different EVs can be charged at different rates. The purpose here is to determine charging current "$I_i$" that satisfies the following conditions at all times, where "ChargingFinishingTime$_i$" represents charging end time of EVi and "DepartureTime$_i$" is the departure time of EVi.

$$\sum_{i=1}^{n} \delta_i(t) I_i V_i \leq P_{avail}(t) \quad \text{[Formula 12]}$$

ChargingFinishingTime$_i \leq$ DepartureTime$_i$
where "$V_i$" is charging voltage for EVi. The value "$\delta_i(t)$" is defined as:

$$\delta_i(t) = \begin{cases} 1 & \text{if } EVi \text{ is being charged} \\ 0 & \text{otherwise} \end{cases}$$

First, departure times of EVs are retrieved from EV profiles. Then, charging current, e.g., minimum average charging current, is assigned to each EV. Then, charging time period for each EV is calculated. Charging time period is calculated as:

$$CT_i = f(Q_i, I_i, SOC_i^{init}, SOC_i^{final}) = \quad \text{[Formula 13]}$$

$$\beta_i \frac{Q_i(SOC_i^{final} - SOC_i^{init})}{100 I_i} \text{hours}$$

$CT_i$: charging time period
$I_i$: charging current
$SOC_i^{init}$: initial SOC of EV battery
$SOC_i^{final}$: target SOC
$\beta_i > 0$: a constant charging/discharging rate, dependent on rated capacity, discharging time, and discharging current. For example, $\beta_i = 1$ for a lithium-ion battery.

Then, required charging power "$P_{EV}(t)$" at each time is calculated as shown below, where "$CS_i$" is charging start time:

$$P_{EV}(t) = \sum_{i=1}^{n} P_i^{EV}(t) \quad \text{[Formula 14]}$$

$$P_i^{EV}(t) = \begin{cases} V_i I_i(t) & \text{if } CS_i \leq t \leq CS_i = CT_i \\ 0 & \text{otherwise} \end{cases}$$

Figure 6:
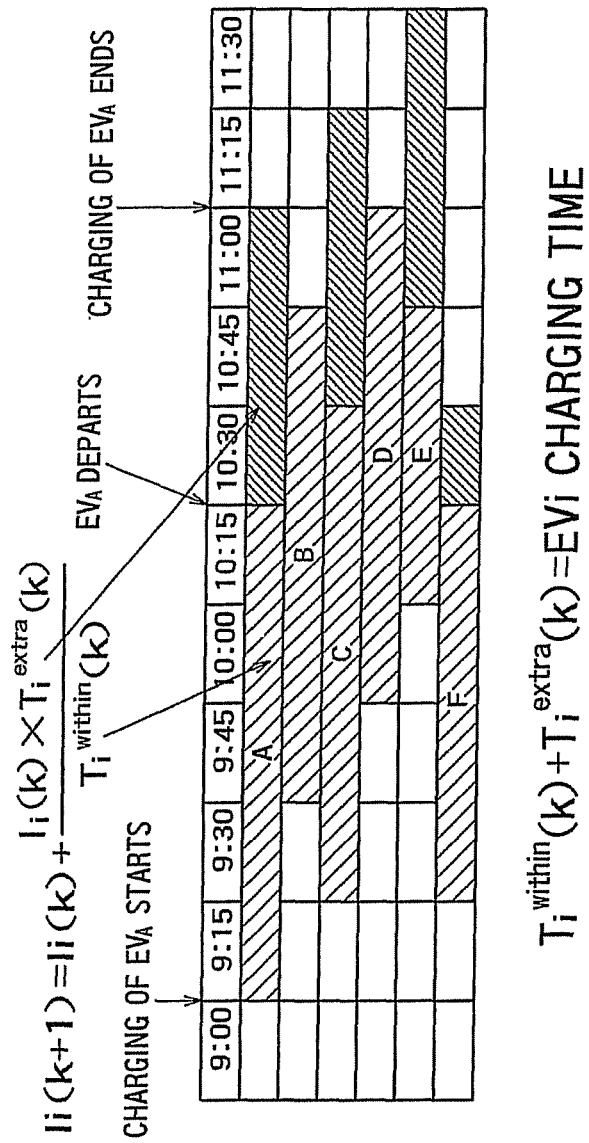
FIG. 6 shows an example of how to update charging current when EVs are charged at a constant rate.

If available power is not sufficient at that time, charging time slots for EVs having lower priority are adjusted. For example, EVs having lower priority can be shifted to the right. Next, it is checked whether the charge schedule is feasible, that is, whether desired charging can be completed by corresponding departure times. If the charging schedule is feasible, the charging schedule and charging current information are written to the EV profile/charging information database in accordance with battery parameters calculated, such as battery SOC. Otherwise, charging current is updated. An example of charging current update is shown below.

$$I_i(k+1) = I_i(k) + \frac{I_i(k) \times T_i^{extra}(k)}{T_i^{within}(k)} \quad \text{[Formula 15]}$$

where "$I_i(k)$" is charging current at the kth iteration, "$T_i^{within}(k)$" is charging time period before the departure time, and "$T_i^{extra}(k)$" is charging time period after departure. A specific example is shown in FIG. 6, where EV A is scheduled to depart at 10:30. If the EV is charged at 20 A and is allocated a charger at 9:15, and also charging is expected to end at 11:15, updated current will be 32 A (=20+20*(11:15–10:30)/(10:30–9:15)).

THIRD EXAMPLE

A third example of charging current determination is presented. Assuming that the stationary battery is able to supply extra power for EV charging when sufficient power is not provided by the grid, an example of charging rate calculation is to divide charging energy by the remaining time length for an EV at the charging station (i.e., the difference between its departure time and the present time). That is, charging current is calculated as:

$$I_i^{EV} = \frac{Q_i^c}{T_i^{departure} - T_i^{current}} \quad \text{[Formula 16]}$$

In this case, power required from the stationary battery at a given time is:

$$P_{sbat}^{req}(t) = \max\left(0, \sum_{i \in queue} V_i I_i^{EV} - P_{grid}(t)\right) \quad \text{[Formula 17]}$$

If power required from the EV battery is larger than the maximum rate of the stationary battery, the charging time slot for the battery and charging rate are adjusted.

The battery charge parameter calculating module 7 of FIG. 1 (which calculates SOC and the like) calculates different parameters for EV and stationary batteries. One parameter is the current SOC of a battery and another parameter is the remaining charging time period. Given that charging current is constant during an interval "t", SOC and the remaining charging time period are calculated as:

Charging $SOC(\%) =$ [Formula 18]

$$SOC_i(t_0) + \frac{100 \int_0^{t+t_0} i(t) dt}{Q_i \times 3600} \Rightarrow SOC_i(t_0) + \frac{100 \times I_i \times t}{Q_i \times 3600}$$

Discharging $SOC(\%) =$ [Formula 19]

$$SOC_i(t_0) - \frac{100 \int_0^{t+t_0} i(t) dt}{Q_i \times 3600} \Rightarrow SOC_i(t_0) - \frac{100 \times I_i \times t}{Q_i \times 3600}$$

$ChargingTime(t) =$ [Formula 20]

$$\frac{(SOC_i^{final} - SOC_i(t_0)) \times Q_i \times 3600}{100 \times I_i} \text{ seconds}$$

where "t" and "$t_0$" are in units of seconds, for example. "Ii" is constant charging or discharging current, and "$Q_i$" is the battery capacity of EVi (Ampere-hour (Ah)).

The target SOC (target charging level) can be configured by a user and can be calculated from the EV's profile. An example calculation of target SOC from an EV profile is presented. The target SOC for the EV battery is shown below. Running distance D below indicates how many kilometers the user wants to drive the EV from now, for example.

Target $SOC(\%) =$ [Formula 21]

$DrivingSOC + MinimumSOC + \alpha =$ $(D \times E \times 100)/(Q \times V / 1000) + m + \alpha$ Q: battery capacity (Ah)
V: rated battery voltage (Volts)
E: energy consumption efficiency (kWh/km)
D: running distance (km)
m: minimum SOC for degradation prevention (%)
α: required SOC for other unknown factors (%)

$$DrivingSOC(\%) = \frac{\text{required power for driving}}{\text{battery capacity(kWh)}} \quad \text{[Formula 22]}$$
$$= \frac{(D \times E \times 100)}{(Q \times V / 1000)}$$

According to the embodiment described above, future arrival of EVs is first predicted using EV charging prediction data in order to determine charging energy that can be provided to waiting electric vehicles or EVs, and then an average charging energy for EVs is calculated. Finally, the average charging power is proportionally adjusted among the waiting EVs. By making a schedule for EVs waiting at a charging station, available electric power is distributed among EVs in consideration of various restrictions to determine the charging rate (charging current) for each EV. This enables fair sharing of available electric power, which can in turn further improve availability of charging. In addition, dynamic scheduling of the present embodiment sometimes enables rapid charging, in which case charging can be done in a shorter time.

Second Embodiment

EVSE (Electric Vehicle Supply Equipment) connectors are sometimes limited, in which case a schedule for assigning EVSE connectors to EVs needs to be set. Priorities can be assigned according to First Come First Serve (FCFS), departure time, EV type, or combination of arrival time, departure time and target charging level or the like. According to FCFS, EVs are charged in the order they arrive at the charging station. When priorities are assigned based on departure time, an EV with the earliest departure time is charged first. When priorities are assigned to EVs according to their type, an emergency vehicle such as an ambulance and a fire truck, or an EV for an executive is given higher priority than other types of EV. When combination of arrival time, departure time, target charging level and EV type is employed for assigning priorities to EVs, the ratio shown below may be used:

$$r_i = \beta_i \frac{Q_i^e}{(T_i^d - T_i^a)} \quad \text{[Formula 23]}$$

where "$Q_i^e$" is the expected charging quantity, "$\beta_i \in [0,1]$" is a penalty factor, and "$T_i^d$" and "$T_i^a$" are departure and arrival times of EVi. A higher ratio (i.e., a larger value of "$r_i$") means higher EV priority.

When EVSE connectors are limited, the connectors are assigned to EVs according to priorities among the EVs, and distribution of electric power available for EVs in the queue is accordingly adjusted. When considering limitation in EVSE connectors, the two ways of calculating EV charging rate described above are represented by the flows of steps shown in FIGS. 7 and 8.

Figure 7:
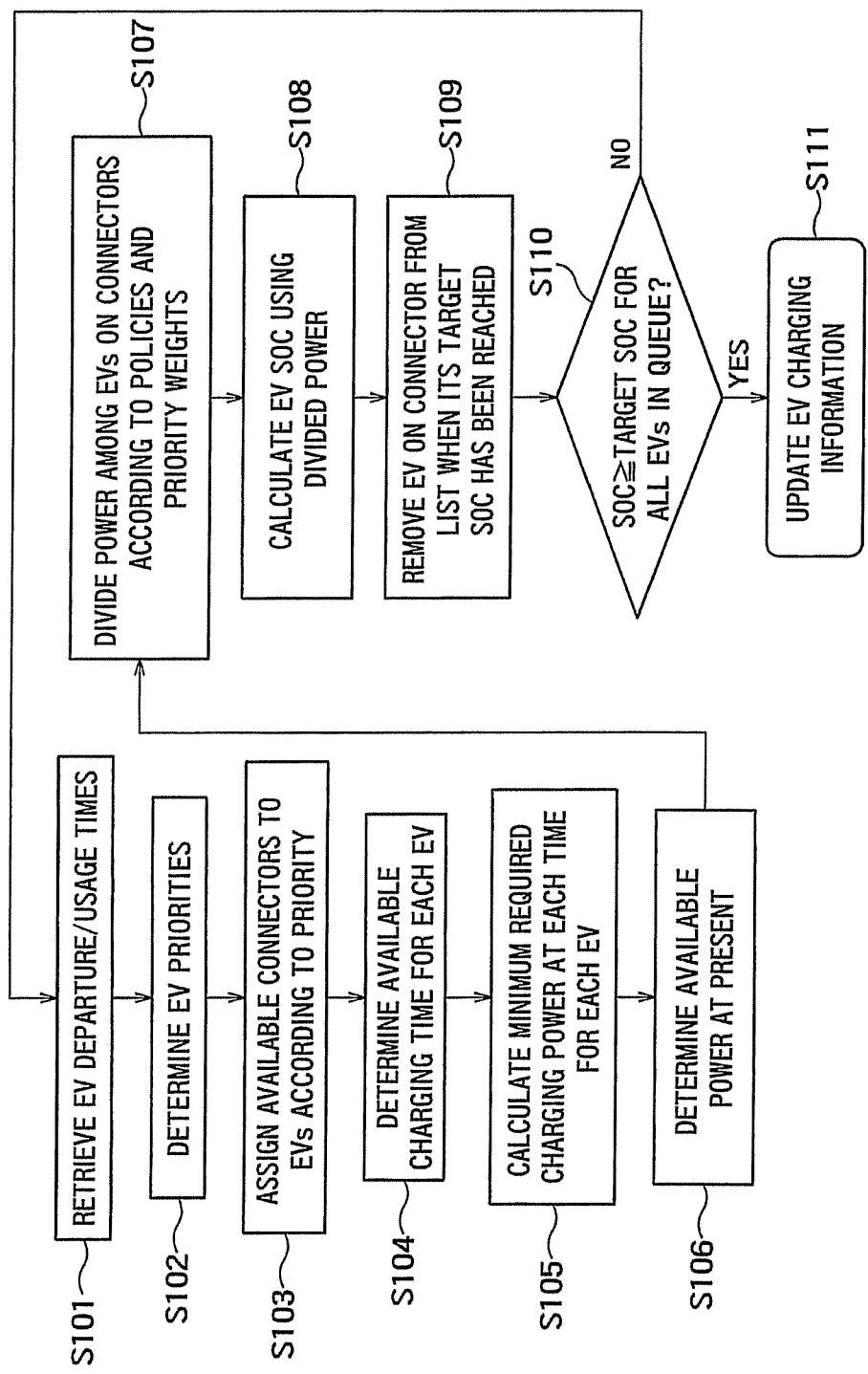
FIG. 7 is a flowchart showing the flow of steps of an example of variable-rate charging scheduling according to the second embodiment.

FIG. 7 shows the flow of steps for the case of variable charging rate described above as the first example.

First, the departure time or usage time of EVs is retrieved from the EV profiles (S101). Then, the priorities of the EVs are calculated in the above-described manner (S102). Available EVSE connectors are assigned to the EVs according to their priorities (S103). Then, available charging time period for each of the EVs is calculated (S104). In order to complete charging of EVs by their expected departure time, the required minimum average charging power at each time is calculated (S105). Then, electric power available at the present is determined in consideration of future power requirement for EVs (S106). This available power is divided among EVs on the EVSE connectors according to policies and priority weights (S107). Using divided electric power, SOC for the EVs is calculated (S108). When the target SOC has been reached for an EV on a connector, that EV is removed from the list (S109). When the target SOC has been reached or exceeded for all EVs in the queue (S110), EV charging information is updated (S111), resulting in a charging schedule.

Figure 8:
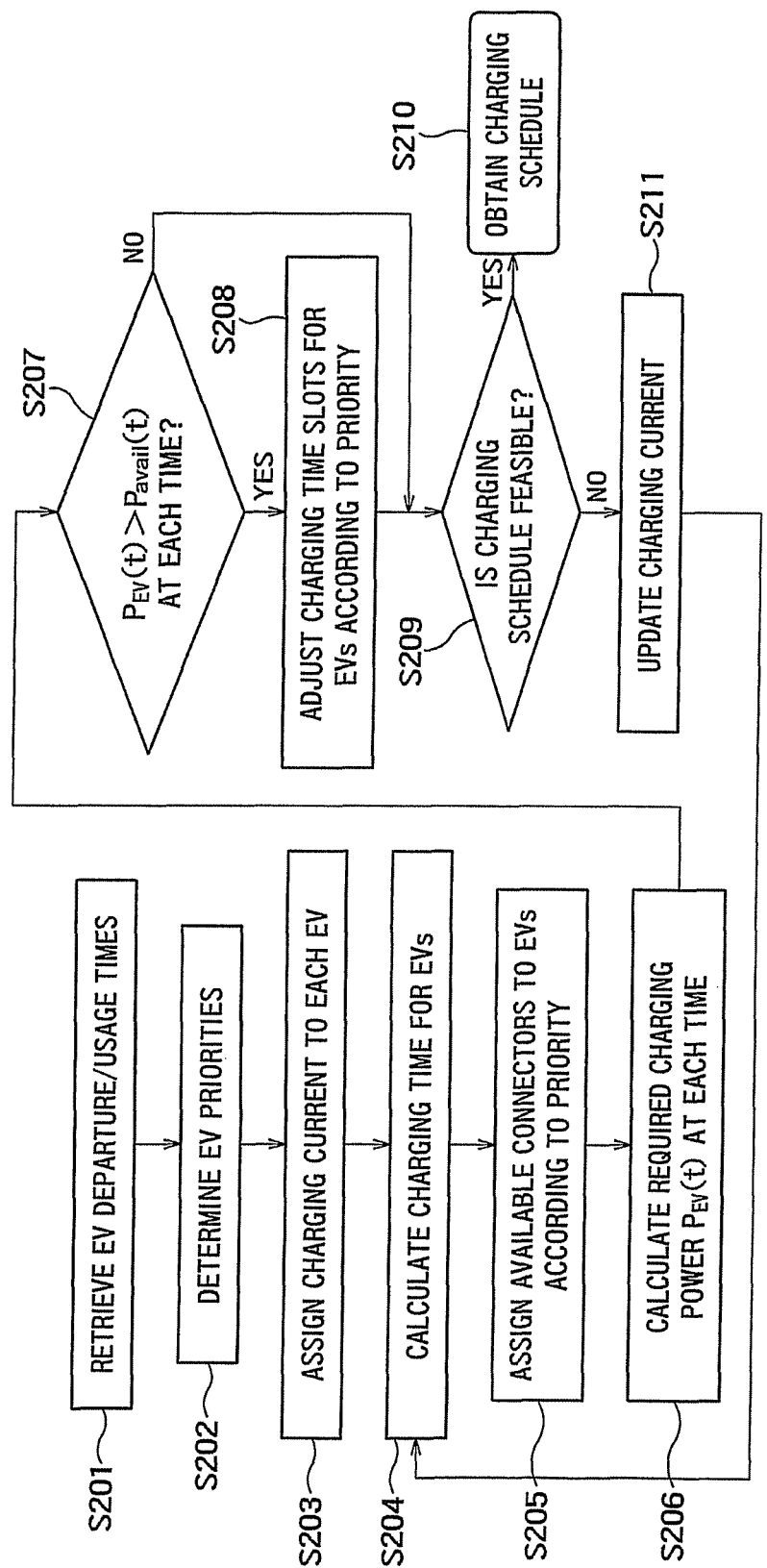
FIG. 8 is a flowchart showing the flow of steps of an example of fixed-rate charging scheduling according to the second embodiment.

FIG. 8 shows the flow of steps of the fixed-rate charging described above as the second example.

First, the departure time or usage time of EVs is retrieved from the EV profiles (S201). Then, the priorities of the EVs are calculated as described above (S202). Then, EV priorities are retrieved. Then, charging current, e.g., minimum average charging current, is assigned to each EV (S203). Then, charging time for each EV is calculated (S204). EVSE connectors are assigned to EVs according to the priorities (S205). Required charging power $P_{EV}(t)$ at each time is calculated (S206). If required charging power $P_{EV}(t)$ exceeds available electric power at any time (S207: YES), that is, if available electric power is not sufficient, charging time slots for EVs are adjusted according to their priorities (S208). For example, charging time slots for EVs of lower priority are adjusted so that those EVs are shifted to the right. Then, it is checked whether the charging schedule is feasible (S209). If feasible, the charging schedule and charging current information are written to the EV profile/charging information database in accordance with battery parameters calculated, such as battery SOC, to yield a charge schedule (S210). Otherwise, charging current is updated (S211).

Third Embodiment

The present embodiment shows an extension of the system. In the extended system, battery charging and discharging cycles are taken into consideration during calculation of charging and discharging currents and charging time. Charging and discharging time and effective charging or discharging power of a rechargeable battery depend on multiple factors, including histories of charge/discharge cycles and charging/discharging rates. The effective capacity of a battery decreases due to degradation associated with charging and discharging cycles used. An example of effective capacity calculation is shown below.

$$Q_i^e = Q_i(1 - \alpha_i(H_i))$$ [Formula 24]

$Q_i$: rated capacity
$H_i$: charging and discharging cycles used
$\alpha_i(H_i)$: degradation rate, which can be defined as:

$$\alpha_i(H_i) = \begin{cases} 0 & \text{if } H_i \leq N_i^{rated}; \\ H_i / N_i^{max} & \text{if } (N_i^{rated} < H_i \leq N_i^{max}); \\ 1.0 & \text{if } (H_i > N_i^{max}) \end{cases}$$ [Formula 25]

where "$N_i^{rated}$" represents rated charging and discharging cycles, and "$N_i^{max}$" is the maximum number of charging and discharging cycles for which the battery can be used.

The electric vehicle charging scheduling system as stated above may also be realized using a general-purpose computer device as basic hardware. That is, each module in the system can be realized by causing a processor mounted in the above described computer device to execute a program. In this case, the system may be realized by installing the above described program in the computer device beforehand or may be realized by storing the program in a storage medium such as a CD-ROM or distributing the above described program over a network and installing this program in the computer device as appropriate. Furthermore, the databases shown in FIG. 1 may also be realized using a memory device or hard disk incorporated in or externally added to the above described computer device or a storage medium such as CD-R, CD-RW, DVD-RAM, DVD-R as appropriate.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. An electric vehicle charging scheduling system, comprising:
   a charging prediction database configured to store information about electric vehicles including at least the number of electric vehicles expected to arrive for charging;
   a profile/charging information database comprising information regarding at least batter capacity, maximum charging voltage, maximum charging current, charging efficiency, or maximum number of charging and discharging cycles of the electric vehicles each of which have been waiting for charging or the one that are being charged;
   a power database configured to store information about a power source including at least a power grid and a stationary battery;
   an energy calculating unit configured to calculate electric energy that can be supplied to the waiting electric vehicles and that is available from the power source based on the power database; and
   a scheduling unit configured to calculate the dynamically changing charging amount that can be supplied to each of the waiting electric vehicles and schedule charging of the electric vehicles waiting for charging, wherein
   the scheduling unit:
      calculates available average energy by dividing electric energy, that can be supplied to the waiting electric vehicles and that is available from the power source, by the total number of the expected electric vehicles and the electric vehicles waiting for charging,
      calculates required charging energy being energy required to charge each of the electric vehicles waiting for charging based on the profile/charging information database including current battery residual of each of the electric vehicles waiting for charging,
      determines the first group of waiting electric vehicles each of whose required charging energy is equal to or smaller than the available average energy, calculates the difference between the available average energy and the required charging energy for each of the first group of waiting electric vehicles, and determines charging energy to be supplied for each of the first group of waiting electric vehicles to the required charging energy,
      determines the second group of waiting electric vehicles each of whose required charging energy is larger than the available average energy, calculates the proportionally distributed energy by distributing the total sum of differences between available average energy and the required charging energy of each of the first group of waiting electric vehicles among the second group of waiting electric vehicles in proportion to magnitudes of differences between the available average energy and the required charging energy of each of the second group of waiting electric vehicles and calculates the charging energy to be supplied for each of the second group of waiting electric vehicles by summing the proportionally distributed energy and the available average energy, and makes a charging schedule so that the first group of waiting electric vehicles and the second group of waiting electric vehicles are respectively supplied with charging energies determined for the first group of waiting electric vehicles and calculated for the second group of waiting electric vehicles.

2. The system according to claim 1, wherein the scheduling unit:

calculates available power/current at each time during a charging period based on total power available from the power source of the power database, calculates an available charging time period as a difference between a departure time and a present time for each of the first and the second groups of waiting electric vehicles based on the profile/charging information database, calculates average charging power/current necessary for charging each of the first and the second groups of waiting electric vehicles within the available charging time period based on the profile/charging information database, calculates charging power/current by distributing the available power/current at each time during a charging period among the first and the second groups of waiting electric vehicles in proportion to the average charging power/current necessary for charging each of the first and the second groups of waiting electric vehicles within the available charging time period, and makes a charging schedule so that each of the first and second group of waiting electric vehicles is supplied the charging energy at the charging power/current determined for each of the first and second group of waiting electric vehicles.

3. The system according to claim 2, wherein the scheduling unit sets the charging power/current to the smaller of the values of the calculated charging power/current and a predetermined maximum power/current defined for each of the first and the second group of waiting electric vehicles such that the calculated charging power/current does not exceed the predetermined maximum power/current defined for each of the first and the second group of waiting electric vehicles, and each of the first and the second group of waiting electric vehicles is not overcharged.

4. The system according to claim 1, wherein the scheduling unit calculates available power/current at each time during a charging period based on the total power available from the power source of the power database, calculates the available charging time period as the difference between the departure time and present time for each of the first and the second groups of waiting electric vehicles based on the profile/charging information database, determines constant charging power/current for each of the first and the second group of waiting electric vehicles so that the total required charging power/current by the first and the second group of waiting electric vehicles is within the limit of the available power/current from the power sources at each time during a charging period, and the supplying of the charging energy to each of the first and second group of waiting electric vehicles can be completed within the available charging time period, and makes a charging schedule so that the each of the first and second group of waiting electric vehicles is supplied the charging energy at the constant charging power/current determined for each of the first and second group of waiting electric vehicles.

5. The system according to claim 1, wherein the scheduling unit calculates the effective capacities of the batteries of the first and the second group of waiting electric vehicles based on the histories of charge and discharge cycles of the batteries, and sets the charging schedule based on the assumption that the first and the second group of waiting electric vehicles have the effective capacities.

6. The system according to claim 1, wherein the profile/charging information database contains information about the number of charging connectors, and the scheduling unit:

determines the priorities of the first and second group of waiting electric vehicles based on the profile/charging information and the charging prediction database, and makes the schedule so that the electric vehicles having higher priority are preferentially connected to the charging connectors and charged.

7. The system according to claim 1, wherein the scheduling unit:

calculates a target charging level for each of the first and second groups of waiting electric vehicles based on the profile/charging information or user settings, assumes that the power sources have sufficient energy for charging the first and second group of waiting electric vehicles to the target charging levels, and makes a charging schedule so that the first and the second groups of waiting electric vehicles can be charged up to the target charging levels within an available charging time period for each of the first and the second group of waiting electric vehicles.

8. The system according to claim 2, wherein the scheduling unit, when a part of the electric vehicles in either the first or the second group of waiting electric vehicles requires charging power/current in descending order, calculates the charging power/current for each of the first and the second group of waiting electric vehicles by decreasing the calculated charging power/current for an electric vehicle being currently charged and proportionally increasing the calculated charging power/current for a newly connected electric vehicle from either the first or the second group of waiting electric vehicles.

* * * * *